United States Patent Office 3,556,740
Patented Jan. 19, 1971

3,556,740
PREPARATION OF COMPLEX METAL HYDRIDES
Jawad H. Murib, St. Bernard, Ohio, assignor to National Distillers and Chemical Corporation, New York, N.Y., a corporation of Virginia
No Drawing. Filed Feb. 4, 1958, Ser. No. 713,091
Int. Cl. C01b 6/28
U.S. Cl. 23—365            10 Claims The present invention relates to a method for preparation of complex metal hydrides and, more particularly, to metal hydrides of the formula $RXH_4$ wherein R is an alkali metal, such as sodium, potassium and lithium, and X is a metal from the group consisting of aluminum, gallium, indium and thallium. Still more particularly, the invention relates to a method for preparation of complex metal hydrides such as sodium aluminum hydride, lithium aluminum hydride, potassium aluminum hydride, etc.

The process of this invention comprises the direct hydrogenation of a metal (from the group consisting of aluminum, gallium, indium and thallium) in the presence of a suitable solvent and an alkali metal hydride to prepare a complex metal hydride of the aforesaid structural formula. In a specific embodiment, the process comprises the direct hydrogenation of aluminum in presence of a suitable solvent and sodium hydride to prepare sodium aluminum hydride. For example, and compared to heretofore disclosed processes, such as for preparation of sodium aluminum hydride the present invention (1) avoids the use of halides such as $AlCl_3$ and $AlBr_3$, (2) it requires only one mole of sodium hydride per mole of product instead of the four moles of the metal hydride required by former methods, such as the following reaction:

(1)      4 $NaH + AlCl_3 \rightarrow NaAlH_4 + 3$ NaCl (2)      4 $LiH + AlCl_3 \rightarrow LiAlH_4 + 3$ LiCl (3) and since it utilizes the elemental metal (e.g., aluminum), alkali metal hydride and hydrogen as starting materials, it eliminates difficulties arising from formation of undesirable by-products (e.g., NaCl, NaBr, LiCl) which coat the reactants resulting in slower reaction rates and decreased yields, and (4) the less bulky reaction mixture facilitates separation of the desired end product.

The reaction to which this invention relates is carried out at an elevated hydrogen pressure which, generally, is in the range of from about 500 to about 4,000 pounds per square inch, and preferably at about 1,000 p.s.i.g.; at a temperature of from about 50 to about 100° C., and preferably, at from about 65 to about 85° C., for a period of from about one to about 20 hours and, preferably, for from about five to about ten hours.

Regarding the relative proportion of reactants, the essential ratio in moles or gram atoms of the alkali metal hydride:aluminum (or other aforedefined metal):hydrogen is 1:1:3/2 with a more preferred range for practice of this invention being 1:3:3. If desired, however, higher proportional amounts of the metal and hydrogen may be used, such as in a ratio of 1:10:10. However, aluminum metal may also be the limiting reactant and the metal hydride and hydrogen used in excess so that an operable ratio may be as high as 3:1:60.

The reaction is carried out in the presence of a reaction medium in which the complex hydride product (e.g., sodium aluminum hydride, lithium aluminum hydride), is soluble and, for that purpose, organic ethers are particularly suitable, examples of which include dimethyl ether, ethyl ether, dioxane, dibutyl ether, tetrahydrofuran, dimethyl ether of ethylene glycol, diethyl ether of ethylene glycol, the dimethyl ether of diethylene glycol, and others. Such ethers are particularly suitable as they appear to stabilize the desired end product, as for example sodium aluminum hydride, and the by-product hydride (e.g., aluminum hydride) by formation of etherates thereof. Thus, in carrying out the desired reaction with such ether reaction mediums, the amount employed is preferably sufficient to solubilize the desired product hydride (e.g., sodium aluminum hydride or lithium aluminum hydride) although the reaction medium may be used in substantial excess, such as up to a hundred fold excess and, preferably, about a tenfold excess.

In order to further describe the invention, the following embodiments are set forth for purposes of illustration and not limitation. Due to the sensitivity of the reactants and products to moisture and oxygen, the described embodiments were carried out under substantially anhydrous and oxygen-free conditions, that is, air free conditions using an inert, dry atmosphere such as nitrogen, argon or helium before hydrogen was admitted to the reactor.

EXAMPLE 1

A mixture of 1.274 g. of sodium hydride (94.5% NaH), 2.189 g. of dried aluminum powder and 60–70 ml. of tetrahydrofuran were ground together in an autoclave (provided with steel balls and an externally driven stirrer) under a hydrogen pressure of 1000 p.s.i.g. at 65–70° C. for 5–6 hours. The autoclave was then cooled to room temperature and the hydrogen was released at a slow rate through a mercury bubbler, following which the autoclave was flushed with argon. The liquid in the autoclave was removed through a glass siphon and filtered through a fritted disc into a flask attached to a vacuum line. The autoclave was washed with an additional 30 ml. of tetrahydrofuran which was also filtered.

From a 10.48 g. portion of the clear filtrate, the tetrahydrofuran was substantially removed by vacuum distillation at room temperature and the solid residue evacuated further for about 30 minutes at 70–80° C. Hydrolysis of the residue generated 441 cc. (19.7 millimoles) of hydrogen (standard conditions). The hydrolysate was heated overnight in a steam bath to completely dissolve a white solid which was formed during the hydrolysis and the resulting solution was analyzed for sodium by flame spectroscopy (using a Beckman Flame Spectrophotometer). The analysis gave a value of 112 mg. (4.87 millimoles) of sodium. The aluminum was determined by gravimetric precipitation as $Al(C_9H_6NO)_3$ by means of 8-hydroxyquinoline and gave a value of 139.5 mg. (5.16 millimoles of aluminum). Thus, the analysis of the product gave an atomic ratio of Na:Al:H of 1.00:1.06:4.04 as compared to the theoretical 1:1:4 for sodium aluminum hydride. The yield of sodium aluminum hydride, based on the sodium hydride used and calculated from total hydrogen evolution, was 84%.

EXAMPLE 2

For this example, 14.511 g. of aluminum, 12.883 g. of sodium hydride and 110 ml. of tetrahydrofuran were reacted under the same conditions as Example 1. A portion of the filtrate was hydrolyzed without attempting to isolate the solid from the solvent. The H/Na ratio was found to be 3.48 in comparison with the theoretical value of 4.

EXAMPLE 3

A reaction using 1.198 g. (47.2 millimoles) sodium hydride, 1.740 g. (64.4 milligram atoms) aluminum and 52 ml. of tetrahydrofuran was carried out in the same manner as Example 1. In this reaction, the free volume of the gas phase in the hydrogenator was calibrated and found to be 888 cc., not accounting for the small volume of the gage and connecting pressure tubings. The bomb was pressurized with hydrogen to 980 p.s.i.g. at room temperature, the hydrogen having been stripped through a pressure U-tube maintained at −196° C. to remove traces of moisture. Heating and grinding of the reaction mixture was continued at 65–70° C. for about 5 hours. Upon cooling the bomb to room temperature, a pressure decrease of 30 p.s.i. was observed. Thus, the amount of hydrogen consumed was 1662 cc. (standard conditions) as compared to 1582 cc. (standard conditions) or 105% of the theoretical quantity required for 47.2 millimoles of sodium hydride used according to the following reaction:

$$NaH + Al + 3/2 H_2 \rightarrow NaAlH_4$$

EXAMPLE 4

The procedure of Example 1 was employed except that lithium hydride was used instead of sodium hydride. A mixture of 0.635 g. lithium hydride, 4.573 g. aluminum, and 51.6 g. tetrahydrofuran was hydrogenated. Analysis of a 25.3 g. portion of the clear filtrate gave 3.55 millimoles lithium, 3.41 millimoles aluminum and 11.9 millimoles of active hydride showing the formation of lithium aluminum hydride.

Increased yields were obtained when longer periods of attrition were applied as per the following:

To the reactants remaining in the autoclave, 47.5 g. tetrahydrofuran were added and hydrogenation was continued for an additional 5 hours. Upon hydrolysis of a 26.0 g. portion of clear filtrate, 24.9 millimoles of hydrogen were evolved. The hydrolysate was found to contain 6.48 millimoles of Li and 6.61 millimoles of Al. Thus the atomic relationship in the product was found to correspond to $Li_{1.00}Al_{1.02}H_{3.84}$, as compared to the theoretical $LiAlH_4$, with a total yield of 27.8%.

EXAMPLE 5

The procedure of Example 1 was repeated except that dimethyl ether of diethylene glycol was used instead of tetrahydrofuran. A mixture of 1.852 g. sodium hydride, 1.571 g. aluminum and 48 ml. dimethyl ether of diethylene glycol was hydrogenated at 920 p.s.i. and 68 to 84° C. for 6.5 hours. Upon analysis, the product gave an empirical composition of $Na_{1.00}Al_{0.99}H_{3.72}$.

EXAMPLE 6

In this reaction, a mixture of 1.423 g. sodium hydride and 1.568 g. aluminum were ground in the absence of a solvent under an atmosphere of argon for 2–3 hours. To this powdered mixture, 50 ml. dimethyl ether of diethylene glycol were added. Hydrogenation of this mixture under the conditions of Example 5 produced sodium aluminum hydride in a 25% yield.

While there are above disclosed but a liimted number of embodiments of the invention herein presented, it is possible to produce still other embodiments without departing from the inventive concept herein disclosed, and it is desired therefore that only such limitations be imposed on the appended claims as are stated therein.

I claim:
1. A method for preparation of complex metal hydrides of the formula

$$RXH_4$$

wherein R is an alkali metal and X is a metal from the group consisting of aluminum, gallium, indium, and thallium which comprises hydrogenating a metal from the aforesaid group in the presence of an alkali metal hydride and an ether solvent for the complex metal hydride product at hydrogen pressure of from about 500 to about 4,000 pounds per square inch at a temperature of from about 50° to about 100° C. for from about one to about twenty hours.

2. A process, as defined in claim 1, wherein X is aluminum and the alkali metal hydride is sodium hydride.

3. A process, as defined in claim 1, wherein the reaction is carried out with use of a mole ratio of alkali metal hydride: the metal X of from 1:3 to from 3:1.

4. A process, as defined in claim 3, wherein the mole ratio of alkali metal hydride:metal X is 1:1.

5. A process, as defined in claim 1, wherein the solvent is an organic ether.

6. A process, as defined in claim 1, wherein X is aluminum, the alkali metal hydride is sodium hydride and the solvent is a member from the group consisting of tetrahydrofuran and dimethyl ether of diethylene glycol.

7. A method for preparation of complex metal hydrides of the formula $$RXH_4$$

wherein R is an alkali metal from the group consisting of sodium and lithium and X is a metal from the group consisting of aluminum, gallium, indium, and thallium which comprises hydrogenating a metal from the aforesaid group consisting of aluminum, gallium, indium, and thallium in the presence of a metal hydride from the group consisting of sodium hydride and lithium hydride and an ether solvent for the complex metal hydride product at hydrogen pressure of about 500 to about 4,000 pounds per square inch at a temperature of about 50° to about 100° C. for about one to about twenty hours.

8. A process, as defined in claim 7, wherein the alkali metal hydride is sodium hydride, the metal is aluminum, and the solvent is an organic ether.

9. A method for preparing an alkali metal aluminum hydride which comprises reacting aluminum and an alkali metal hydride with hydrogen at a temperature sufficiently elevated to effect the reaction and under superatmospheric pressure in the presence of tetrahydrofuran.

10. A method for preparing an alkali metal aluminum hydride which comprises reacting aluminum and an alkali metal hydride with hydrogen at a temperature sufficiently elevated to effect the reaction and under superatmospheric pressure in the presence of a liquid selected from the group consisting of tetrahydrofuran and the dimethyl ether of diethylene glycol.

References Cited

UNITED STATES PATENTS

| 2,920,935 | 1/1960 | Finholt | 23—14 |
| 2,900,402 | 8/1959 | Johnson | 260—448A |
| 2,992,248 | 7/1961 | Pearson | 23—14X |
| 2,372,670 | 4/1945 | Hansley et al. | 23—204 |

FOREIGN PATENTS

| 770,707 | 3/1957 | Great Britain | 260—448A |

OTHER REFERENCES

Corney et al.: Chemical Solubilities, 2nd Ed., 1921, p. 379.

MILTON WEISSMAN, Primary Examiner